Sept. 10, 1963   R. LE BRUSQUE   3,103,148
FLUID POWER SYSTEM
Filed June 22, 1961   2 Sheets-Sheet 1
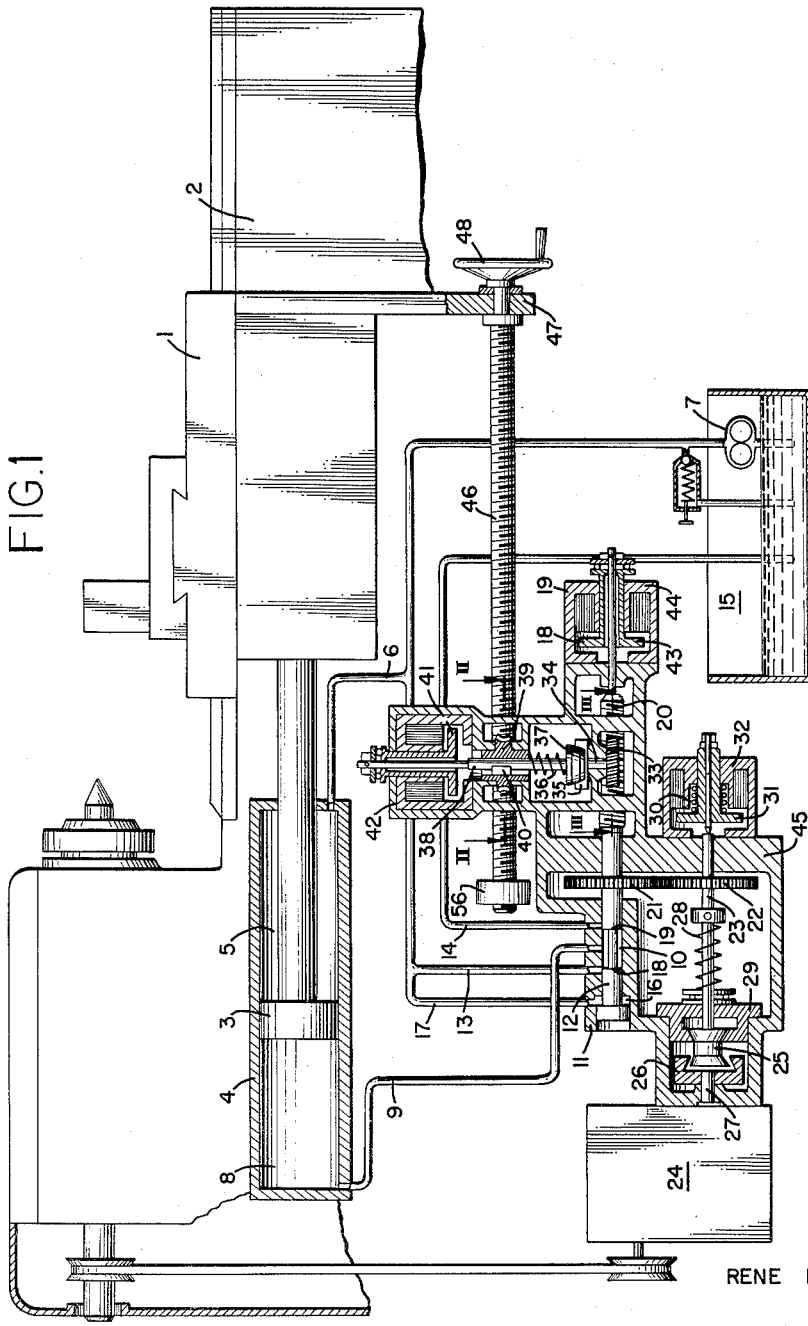
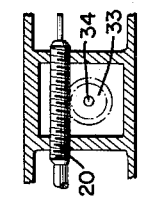
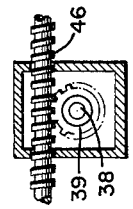
INVENTOR
RENE LE BRUSQUE Sept. 10, 1963
R. LE BRUSQUE
3,103,148
FLUID POWER SYSTEM
Filed June 22, 1961
2 Sheets-Sheet 2
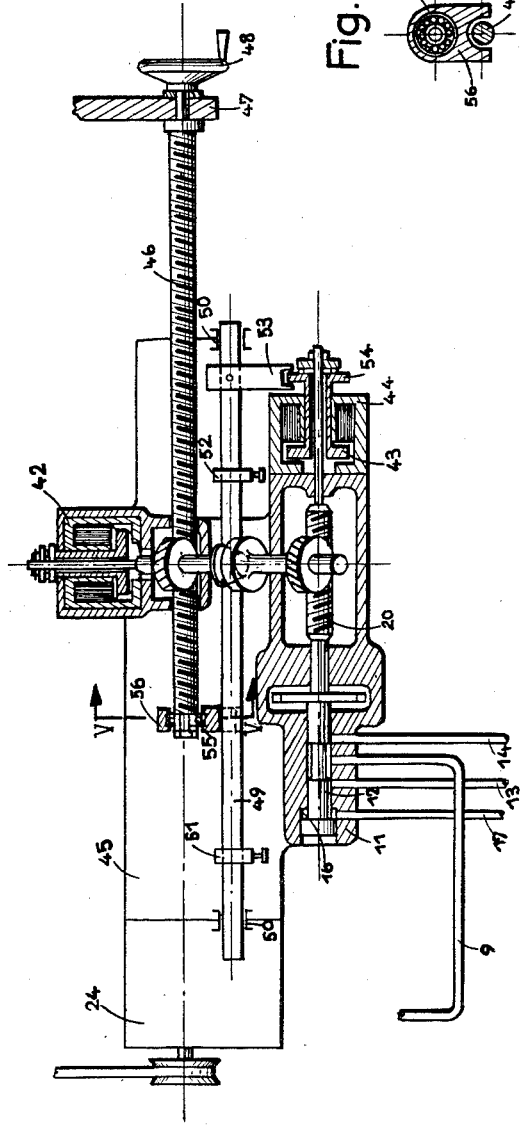

3,103,148
FLUID POWER SYSTEM
René Le Brusque, Malakoff, France, assignor to H. Ernault Batignolles S.A., Paris, France, a company of France
Filed June 22, 1961, Ser. No. 118,795
Claims priority, application France July 21, 1960
7 Claims. (Cl. 91—380)

This invention relates to systems for reciprocating a mechanical element by fluid power. It is especially though not exclusively applicable to such fluid power systems for reciprocating slidable components of machine-tools. A general object of the invention is to provide an improved system for reciprocating a mechanical element by fluid power, which will permit highly accurate control of the linear velocity of reciprocation of the element between wide limits. Another object is to provide an improved form of mechanical rate feedback connection for a fluid power system.

In conventional hydraulic control systems for the positional adjustment and reciprocation of machine-tool components, the hydraulic components and electrical components (if provided) are apt to be dispersed throughout various points of the machine-tool assembly including both the stationary and moving structures of the assembly. This requires the provision of flexible hydraulic lines and electric wiring, prone to damage; moreover the dispersed, delicate, components of the power system are difficult to protect adequately against abrasive cuttings and the like. It is therefore an object of this invention to provide an improved hydraulic power system for a machine-tool so designed that substantially all of its hydraulic and electrical components can be conveniently grouped into an integrated structure mounted on the stationary machine frame, consequently easy to protect and devoid of flexible connections. Another object is to eliminate the requirement, generally present in current hydraulic machine tool control systems, of providing a pilot screw of great length mounted on the machine frame and which is difficult to adjust and maintain in adjusted condition in service. A broader object is to provide a hydraulic power system for a machine tool which will be more robust, accurate and flexible than comparable systems now in use.

In accordance with an important aspect of the invention there is provided a fluid power system for controllably reciprocating an element, which comprises a fluid actuator mechanically connected to said element for displacing it; a control valve connected in a fluid flow circuit with the actuator, a pressure fluid source and exhaust and including a valve member axially shiftable in opposite directions from a neutral position for causing the actuator to displace the element in a corresponding direction; the valve member being furthermore rotatable about an axis parallel to its direction of displacement; a worm rotatable and axially shiftable with the valve member; a worm gear meshing with the worm; means, such as a rack member or a lead screw and a further gear meshing therewith, carried by said element for rotating the worm gear on displacement of the element; and means for imparting rotation to the valve member and worm in a selected direction and at a selected rate whereby the reaction of the worm against the worm gear will shift the valve member away from neutral position and the consequent displacement of the element will rotate the worm gear to shift the valve member back toward neutral position thereby to provide a rate feedback action for proportioning the velocity of the element with said selected angular rate.

An exemplary embodiment of the invention will now be described with reference to the accompanying drawings wherein:

FIG. 1 is a general view, partly in vertical side section and partly diagrammatic, of an improved hydraulic power system according to the invention as applied to a lathe, the latter shown in fragmentary outline;

FIG. 2 is a sectional view of a detail on line II—II of FIG. 1;

FIG. 3 is a similar view on line III—III of FIG. 1;

FIG. 4 illustrates a limit stop arrangement unable with the system of FIG. 1, shown generally in longitudinal section, with some of the components appearing in FIG. 1 being shown in modified positions for the clarity of the drawing; and FIG. 5 is a detail view in section on line V—V of FIG. 4.

Referring to FIG. 1, there is schematically shown a lathe including a bench 2 having a slide 1 slidable on longitudinal ways thereon. Slide 1 is connected through a piston rod with a piston 3 slidable within the cylinder 4 of a hydraulic actuator attached to a fixed part of the machine structure. The actuator is of a conventional differential type. That is, its smaller cylinder chamber 5 surrounding the large-diameter piston rod is permanently connected by a pressure line 6 with the outlet of a pump 7 drawing oil from a reservoir 15. The larger chamber 8 of the actuator cylinder is connected by a control line 9 with an annular chamber 10 defined between the spaced lands of a valve member or spool 12 forming part of a control valve 11. Connecting with the bore in the valve casing 11 on opposite sides from the control line 9 are two lines 13 and 14, line 13 being a pressure inlet line connected with the outlet of pump 15 and line 14 being an exhaust line connected with reservoir or sump 15. Another pressure inlet line 17 branching off from line 13 connects with an end chamber 16 provided in the valve casing bore, so as permanently to bias the valve spool 12 by hydraulic pressure in a direction, leftward in the drawing, toward a position in which control line 9 is connected with the pressure inlet line 13.

The valve member or spool 12 is extended beyond the right hand end of the valve casing in the form of a shaft slidable and rotatable in a fixed wall 45' of the frame, and is formed beyond said wall with a worm 20 herein sometimes referred to as the pilot screw. Worm 20 is formed with a screw thread of a pitch length small enough to render the screw irreversible in character. Pilot screw or worm 20 is in mesh with a worm gear 33 (also see FIG. 3) secured on the lower end of a shaft 34 journalled in suitable bearings and adapted for coupling engagement with another shaft 38 rotatably and slidably supported in alignment with and above the shaft section 34. For this purpose shaft section 34 carries a female clutch member 35 and a male clutch member 37 carried on shaft 38 is urged axially into engagement with member 35 by a spring 36. The shaft 38 is slidably but non rotatably connected through a suitable keyway 40 with a further gear 39 (also see FIG. 2) which meshes with a rack or lead screw 46 presently described. Further the upper end of shaft 38 carries a magnetic core 41 axially slidable in a solenoid winding 42, so that energization of the solenoid through means not shown displaces shaft 38 and clutch member 37 upwards in opposition to spring 36 thereby disengaging the shaft sections 38 and 34.

Rotation can be imparted to the valve member 12 and pilot screw 20 through the meshing gears 21 and 22, gear 22 being secured on a shaft 23 which is adapted to be selectively rotated in either sense or blocked against rotation. For this purpose, in the embodiment shown, shaft 23 is supported for rotation and axial displacement in the frame, and carries a brake and clutch unit 25 which includes a pair of opposite conical clutch members; in one (right-hand as shown) axial position of the shaft 23 one of the conical clutch surfaces of unit 25 engages the complementary conical surface of a clutch member 26 secured on the output shaft 27 of a changespeed gearbox 24 having its input shaft rotated by belt drive from the lathe spindle, the gearbox 24 being settable for imparting any one of a plurality of drive ratios to shaft 27 in either sense of rotation. In another (leftward) axial position of shaft 23 the other conical clutch surface of unit 25 engages a complementary stationary member 29 for positively braking the rotation of shaft 23. A relatively light spring 28 biasses shaft 23 into engagement with the drive member 26. The outer end of shaft 23 engaged by a magnetic core 31 slidable in a solenoid 32 and biassed into engagement with the shaft 23 by a spring 30 which normally overpowers the light spring 28. Energization of the solenoid winding 32 displaces the armature and shaft 23 rightward in opposition to spring 30 to engage shaft 23 for rotation with the output shaft 27 of the gearbox 24. It will be understood that any other suitable selective drive means might be provided for shaft 23, and the drive may if desired be powered from an independent motor rather than from the lathe spindle as shown, or in some applications rotation may be imparted manually.

The pilot screw 20 in addition to bring rotatable by the means just described can be reciprocated axially to a limited extent. For this purpose the outer end of pilot screw 20 is shown as being connected with a solenoid core 43 slidable in a solenoid 44, so that energization of the solenoid will impart a rightward displacement to the pilot screw and valve spool 12.

All of the mechanism described for controlling the pilot screw 20 and valve spool 12 in rotation and axial displacement is conveniently constructed as a compact unit supported on a frame member 45 secured to the frame structure of the lathe.

As previously mentioned the gear 39 meshes with a rack or its equivalent, i.e. as here shown a lead screw 46, rotatably supported in bearings such as 47 depending from the slide 1 of the lathe, and manually rotatable by means of a wheel 48, for imparting manual reciprocation to the slide as will presently appear.

The system so far described operates as follows:

In the idle condition of the machine-tool all three solenoids 32, 42 and 44 are deenergized, so that shaft 23 is blocked against rotation, shaft sections 34 and 38 are engaged, and the assembly comprising pilot screw 20 and valve member 12 exerts through worm gear 33, coupled shafts 34—38 and gear 39, a force reacting against the threads of lead screw 46 owing to the leftward biassing pressure exerted in chamber 16 on valve spool 12, such force being, however, too small to cause any displacement of lead screw 46 through the wheels 33 and 39. In this condition any tendency of the slide 1 to move in either direction from its position would, through lead screw 46, gear 39, worm gear 33 and pilot screw 20, result in shifting the valve spool 12 in the proper direction to return the slide to its original position. For example incipient rightward displacement of slide 1 would cause lead screw 46 to rotate gear 39 counter-clockwise as seen from the bottom of shaft 34—38, and worm gear 33 would thereupon shift pilot screw 20 and with it valve spool 12 rightward, connecting actuator chamber 8 with exhaust line 14 so that the resulting pressure drop in chamber 8 would tend to draw piston 3 leftward, counteracting the assumed incipient displacement of the slide. An incipient leftward displacement of the slide would be similarly counteracted by the actuator.

When the machine is started in operation solenoid 32 is energized, thereupon coupling shaft 23 with the output shaft 27 of the changespeed gear 24. The pilot screw 20 is now driven through gearing 22—21 in rotation at an angular rate and in a direction determined by the setting of the changespeed gear. Rotation of pilot screw 20 with respect to the relatively stationary worm gear 33 shifts screw 20 and valve spool 12 right or left depending on the selected gear setting, and thereby connects the motor line 9 with either pressure line 13 or sump line 14 to produce a controlled displacement of the slide 1 in a direction and at a velocity determined by the gear setting in box 24. The lead screw 46 is axially displaced with the slide 1, and acts through gear 39, coupled shaft sections 38—34, worm gear 33 and pilot screw 20, to urge the valve spool 12 in the opposite direction from that imported to it by the rotation of worm 20. Thus for instance, assuming the setting of gearbox 24 was such that the resulting rotation of pilot screw 20 tends to displace spool 12 rightward, the spool interconnects lines 9 and 14 to decrease the pressure in chamber 8, slide 1 is displaced leftward, lead screw 46 rotates gears 39 and 33 clockwise (as seen from the bottom of FIG. 1), and worm gear 33 thus urges worm 20 and spool 12 leftward; the spool thereupon tends to increase the pressure in chamber 8. The net effect of the arrangement described is to provide a rate feedback loop of mechano-hydraulic character whereupon the slide 1 will be displaced at a velocity strictly proportional to the rate of rotation of the drive shaft 27 as preset into the speed box 24 and of course in the selected direction. Specifically, should the slide 1 for any reason tend to lag behind the prescribed velocity of displacement (due for example to a hard point in the work or any other cause), the lead screw 46 would act through the gears to impart to the spool 12 a small axial shift in the direction required to increase the pressure differential across the piston 3 until the prescribed slide velocity has been restored. A similar but reverse action occurs in the event that the slide tends to move in excess of its prescribed velocity. So long as the slide is moving exactly at its prescribed velocity as determined by the setting of gearbox 24, the valve spool 12 retains a stationary position in the casing at which there is a uniform, low-rate, flow of fluid through line 9 and either of lines 13 or 14 in the proper sense and at the proper low velocity to maintain the desired rate of feed displacement of the slide 1.

When desired to produce a rapid displacement of the slide in one or the other direction, the solenoids 42 and 44 are selectively energized in the manner now to be described. To move the slide rapidly in the rightward direction, solenoid 42 is energized while solenoid 44 is retained in deenergized condition. Energization of solenoid 42 disengages clutch member 37 from member 35 thus disconnecting shaft member 34 from 38. The assembly including pilot screw 20 and valve spool 12 is now exposed to the sole action of the biassing pressure in valve chamber 16 so that the spool 12 is driven to its endmost lefthand position, allowing the full source pressure from line 13 to be applied through line 9 to cylinder chamber 8, and moving the slide rapidly to the right. To produce a rapid advance of the slide 1 in the opposite, lefthand, direction, both solenoids 42 and 44 are energized. The action of solenoid 44 predominates over the biassing pressure in valve chamber 16 to shift the spool 12 to its endmost right-hand position, connecting the cylinder chamber 8 with exhaust line 14 and producing the desired rapid left-hand advance of the slide.

Manual displacement of the slide 1 can at any time be effected by action on the handwheel 48. This rotates lead screw 46 to rotate the worm gears 39 and 33 and hence to impart an axial displacement to the valve spool 12 in one or the other direction depending on the direction of rotation of handwheel 48, causing a corresponding displacement of the slide 1 and hence of lead screw 46. So soon as the manual rotation of the handwheel is discontinued, the valve spool 12 is immediately restored to the position in which it acts to maintain the piston 3 and slide 1 at the particular position attained on release of the handwheel.

A limit stop arrangement for the rapid displacement control system described is illustrated in FIG. 4, which partially illustrates the same general system as FIG. 1 though some of the parts have been shown somewhat rearranged for clarity. The limit stop arrangement comprises a stop bar 49 mounted in bearings 50 for limited axial displacement relatively to the frame of the machine and positioned generally parallel and close to the lead screw 46. Slidably supported on the bar 49 between bearings 50 are a pair of adjustably blockable limit stop members 51 and 52. The lead screw 46 carries a stop fork member 56 mounted on the end of the screw remote from the handwheel 48, the fork member 56 being freely rotatable relative to the screw through a suitable ball bearing 55 and having a pair of spaced arms which are adapted to encompass the abutment bar 49 between the stops 51 and 52 in all positions of the lead screw, as will be clear from FIGS. 4 and 5. The stop bar 49 in turn carries a fork member 53 fixed near one end of the bar and projecting into two-way driving engagement with a flange 54 carried by the outer end of the magnetic armature 43 associated with solenoid 44. This limit stop arrangement operates as follows.

When upon energization of electromagnet 42 and consequent disengagement of clutch 35—37 for rapid advance of slide 1 in the rightward direction said slide attains a preset end position in which the stop fork 56 on the lead screw 46 engages the stop 52, stop bar 49 is pushed rightward and through fork 53 imparts a rightward displacement to the armature 54 and the pilot screw 20 with valve spool 12 are forced rightward against the biassing pressure in valve chamber 16, so as to connect the actuator chamber 8 with the exhaust, whereby the rightward displacement of the slide 1 is arrested, arresting the displacement of lead screw 46 and hence valve spool 12. The spool therefore stops at a position of balance at which the slide 1 is retained in its desired end position. A generally similar action occurs during the leftward movement of slide 1 when the lead screw stop fork 56 engages the leftward stop 51. The stop bar fork 53 then forces the armature 43 leftward in opposition to the magnetic attraction of the energized solenoid 44, displacing the valve spool 12 to a leftward position in which the actuator chamber 8 is connected with the pressure source a sufficient amount to produce the pressure balance whereupon the movable slide assembly comes to a stop.

The above described operation of the stop system is operative both when the slide is being displaced manually by rotation of the handwheel 48 and in the automatic operation of the slide at a preset velocity from the drive 24.

The machine tool control system thus described provides an extremely accurate, smooth and flexible drive with a high degree of proportionality between the actual velocity of slide displacement and the prescribed velocity setting over a very wide range of velocity settings from extremely slow to very fast.

Moreover the system has a number of advantageous features ascribable to the fact that the sole mechanical connection present between the mechanism supported from the stationary machine frame and the slide of the machine, is the meshing engagement between worm gear 39 and lead screw 46. Thus, all of the hydraulic and electric connections required in the system connect with stationary structure and can be provided rigid rather than flexible. The provision of rigid, fixed conductors of fluid and electric energy is a remarkably advantageous feature since it minimizes risk of damage and reduces space requirements. Also the system makes it possible to combine all of the hydraulic and electric components into a single unit which can be completely assembled, tested and adjusted in the factory prior to installation on site, reducing installation and maintenance costs. The positioning of the reference lead screw 46 on the slide rather than on the frame of the machine facilitates accurate mounting and adjustment and improves sensitivity and precision.

It will be understood that various modifications may be made in the single exemplary embodiment of the invention illustrated and described without exceeding the scope of the invention as claimed. The type of fluid actuator used and the connections thereof with the control valve and remainder of the fluid flow circuit may differ from those shown. As earlier indicated, the lead screw may be replaced by a rack, or by some other mechanism for rotating the worm gear on displacement of the controlled element. The means for actuating the clutches and manually shifting the valve member are not necessarily electromagnets. The invention as a whole is applicable to power systems for controlling the displacements of mechanical elements in various fields of engineering other than the field of machine-tools.

What is claimed is:

1. In a machine tool including a hydraulically reciprocable member an a rotatable lead screw connected to said member for lengthwise movement therewith, a stationary valve control system for said reciprocable member comrising a valve means movable between a predetermined advance position and a predetermined return position, a rotatable rod integral with said valve means, a worm gear formed on said rod, a first worm-wheel in meshing engagment with said worm gear, a second worm-wheel in meshing engagement with said lead screw and including a drive connection with said first worm-wheel, said drive connection being effective to lock said first worm-wheel against rotation by reaction of said second worm-wheel against said lead screw or to rotate said first worm-wheel and thereby shift said valve means, in accordance with any lengthwise or rotary movement of said lead screw, a clutch interposed in said drive connection, means for rotating said worm gear in a selected direction at a selected substantially constant speed for causing said worm gear to react against said first worm-wheel so as to shift said valve means towards one or the other of said predetermined positions until said reciprocable member is caused to rotate said first worm-wheel through said lead screw and said drive connection in such a direction and at such speed as to prevent said reaction of said worm gear against the first worm-wheel, resilient means for urging said valve means to one of said predetermined positions, first controllable means for disengaging said clutch so as to permit said resilient means to shift said valve means to said one predetermined position, and second controllable means for shifting said valve means against the action of said resilient means to its other predetermined position.

2. In the combination claimed in claim 1, manual means for rotating the lead screw.

3. In the combination claimed in claim 1, a bar mounted for limited axial displacement parallel to said valve member and lead screw, a pair of limit stop members adjustably positionable in spaced relation along the bar, abutting means carried by the lead screw and having opposite surfaces respectively engageable with the stop members, and a drive connection between the bar and valve member whereby on engagement of either of said surfaces with one of the stop members and consequent limited shifting of said bar said valve member will be shifted in a sense to be restored to a neutral position thereof.

4. A machine tool according to claim 1 wherein said resilient means includes fluid pressure responsive means associated with said valve means for urging said valve means to one of said predetermined positions thereof, said first controllable means includes a first electromagnetically operated means effective, upon energization, for rendering said clutch inoperative so as to permit said fluid pressure responsive means to shift said valve means to said one predetermined position, and said second controllable means including a second electromagnetically operated means effective, upon energization of both said first and second electromagnetically operated means, to shift said valve means against the action of said fluid pressure resoponsive means to its other predetermined position.

5. A machine tool according to claim 1 in which said one predetermined position of said valve means is a rapid advance position and the other predetermined position of the valve member is a rapid return position.

6. In a machine tool including a hydraulically reciprocable member and a rotatable lead screw connected to said member for lengthwise movement therewith, a stationary valve control system for said reciprocable member comprising a rotatable valve member slidably movable from a neutral position in either one of two opposite directions, said valve member having a length portion formed so as to provide a worm gear, a first worm-wheel in meshing engagement with said worm gear, a second worm-wheel in meshing engagement with said lead screw, a drive connection between said first worm-wheel and said second worm-wheel effective to rotate said first worm-wheel from said second worm-wheel as said lead screw is moved by said reciprocable member or to lock said first worm-wheel against rotation by reaction of the second worm-wheel against said lead screw as long as the latter remains stationary, and means for rotating said worm gear in a selected direction at a selected substantially constant speed whereby to move said valve member longitudinally relative to said first worm-wheel until the latter is rotated through said drive connection in such a direction and at such speed as to stop said longitudinal movement of the valve member.

7. A machine tool according to claim 6, further comprising means for yieldingly urging said valve member in one of said two opposite directions.

References Cited in the file of this patent
UNITED STATES PATENTS 2,601,157    Le Lan _____ June 17, 1952
2,994,304    Shultz _____ Aug. 1, 1961